United States Patent [19]

Maroun et al.

[11] Patent Number: 5,425,056
[45] Date of Patent: Jun. 13, 1995

[54] METHOD AND APPARATUS FOR GENERATING THRESHOLD LEVELS IN A RADIO COMMUNICATION DEVICE FOR RECEIVING FOUR-LEVEL SIGNALS

[75] Inventors: Carla J. Maroun; Daniel Morera; Mark Oliboni, all of Boynton Beach, Fla.

[73] Assignee: Motorola, Inc., Schaumburg, Ill.

[21] Appl. No.: 35,771

[22] Filed: Mar. 23, 1993

[51] Int. Cl.$^6$ ............................................. H03K 9/00
[52] U.S. Cl. .................................. 375/316; 375/317; 455/169.1
[58] Field of Search .................... 375/76, 17, 118, 75; 341/56; 455/169.1

[56] References Cited

U.S. PATENT DOCUMENTS

| | | |
|---|---|---|
| 3,537,084 | 10/1970 | Behr . |
| 3,571,725 | 3/1971 | Kaneko .................... 341/56 |
| 3,719,934 | 3/1973 | Behr et al. . |
| 3,736,582 | 5/1973 | Norris . |
| 4,408,189 | 10/1983 | Betts et al. ................. 341/56 |
| 4,631,737 | 12/1986 | Davis et al. . |
| 4,866,261 | 9/1989 | Pace . |
| 4,928,288 | 5/1990 | D'Aria et al. ................. 375/17 |
| 4,929,851 | 5/1990 | Pace . |

Primary Examiner—Edward L. Coles, Sr.
Assistant Examiner—Madeleine Nguyen
Attorney, Agent, or Firm—Kelly A. Gardner; John H. Moore

[57] ABSTRACT

A symbol detector (110) for generating data symbols from a received signal having multiple signal voltages comprises an analog-to-digital converter (115) for converting the multiple signal voltages to digital values and peak and valley counters (310, 315) coupled to the analog-to-digital converter (115) for tracking the digital values to determine peak and valley values associated with high and low voltages, respectively, of the received signal. The symbol detector (110) further comprises calculation circuitry (120) coupled to the peak and valley counters (310, 315) for calculating upper, lower, and center thresholds in accordance with the peak and valley values and a decoder (125) coupled to the analog-to-digital converter (115) and the calculation circuitry (120) for generating the data symbols in accordance with the digital values and the upper, lower, and center thresholds.

17 Claims, 6 Drawing Sheets

METHOD AND APPARATUS FOR GENERATING THRESHOLD LEVELS IN A RADIO COMMUNICATION DEVICE FOR RECEIVING FOUR-LEVEL SIGNALS

FIELD OF THE INVENTION

This invention relates in general to radio communication devices, and more specifically to a radio communication device for receiving four-level signals.

BACKGROUND OF THE INVENTION

Digital communication systems, such as selective call paging systems, have utilized binary digital signalling formats for many years. When such digital signalling formats have been utilized, the digital information has been modulated onto the carrier using modulation techniques such as frequency shift keying (FSK), wherein the digital information is directly modulated onto the carrier. Within the receiver, the frequency shift keyed carrier is demodulated and further processed to provide a stream of digital data. Such modulation and demodulation techniques, while effective at lower data bit rates, such as data bit rates below approximately 6000 bits per second, are not effective at higher data bit rates due to synchronization problems in simulcast systems. As a result, other modulation techniques are required to enable higher data throughput at lower symbol rates.

One such modulation technique which allows higher data throughput at lower symbol rates is a multi-level frequency modulation technique, such as four-level frequency modulation (FM). As compared to conventional frequency shift keyed modulation, four-level FM allows twice the data throughput for a given data symbol rate. In conventional four-level FM receivers, the carrier is received and converted to analog voltages. The analog voltages then are compared to pre-programmed threshold levels to allow a determination of which of four data symbols should be generated for each analog voltage. Although this demodulation technique provides a stream of digital data, the data may not always be recovered accurately because the pre-programmed threshold levels do not allow for variations in the received carrier which result in voltage offsets. As further offsets in the received carrier occur, greater voltage offsets are encountered and incorrect data symbols can be generated, possibly causing erroneous recovery of information from the radio signal. Thus, what is needed is a method and apparatus, for use with multi-level signalling formats, for dynamically varying the threshold levels utilized for recovery of data symbols in response to variations in the voltage offsets caused by voltage variations in the received carrier.

SUMMARY OF THE INVENTION

According to a first aspect of the present invention, a method for generating data symbols from a received signal having multiple signal voltages comprises the steps of tracking signal voltages of the received signal to determine peak and valley values associated with high and low voltages, respectively, of the received signal and calculating therefrom upper, lower, and center thresholds of the received signal, wherein the upper, lower, and center thresholds define four ranges of values.

The calculation of the upper and lower thresholds comprises the steps of dividing the peak value and a decrement value by a first predetermined number to result, respectively, in first and second integers and first and second remainders, wherein the decrement value is equivalent to the number of times a counter has been decremented to result in the valley value. The calculation further comprises the steps of adding, when the sum of the first and second remainders is greater than a second predetermined number, the first and second integers and a third predetermined number to result in a first sum value and adding, when the sum of the first and second integers is not greater than the second predetermined number, the first and second integers to result in the first sum value. The calculation still further comprises the steps of subtracting the first sum value from a fourth predetermined number to result in a second sum value, adding the second sum value and the peak value to generate the upper threshold, and subtracting the second sum value from the valley value to generate the lower threshold.

The method comprises the additional steps of determining which of the four ranges of values encompasses a received signal voltage and generating, in response to the determining step, one of four possible data symbols.

According to a second aspect of the present invention, a symbol detector for generating data symbols from a received signal having multiple signal voltages comprises an analog-to-digital converter for converting the multiple signal voltages to digital values, peak and valley counters for tracking the digital values to determine peak and valley values associated with high and low voltages, respectively, of the received signal, and calculating circuitry for calculating upper, lower, and center thresholds in accordance with the peak and valley values.

The calculating circuitry comprises dividing circuitry for dividing the peak value and a decrement value by a first predetermined number to result, respectively, in first and second integers and first and second remainders, wherein the decrement value is equivalent to the number of times the valley counter has been decremented to result in the valley value. A first summer within the calculating circuitry adds, when the sum of the first and second remainders is greater than a second predetermined number, the first and second integers and a third predetermined number to result in a first sum value and adds, when the sum of the first and second remainders is not greater than the second predetermined number, the first and second integers to result in the first sum value. A second summer subtracts the first sum value from a fourth predetermined number to result in a second sum value, a third summer adds the second sum value to the peak value to generate the upper threshold, and a fourth summer subtracts the second sum value from the valley value to generate the lower threshold.

The symbol detector also includes a decoder coupled to the analog-to-digital converter and the calculating circuitry for generating the data symbols in accordance with the digital values and the upper, lower, and center thresholds.

DESCRIPTION OF A PREFERRED EMBODIMENT

Figure 1:
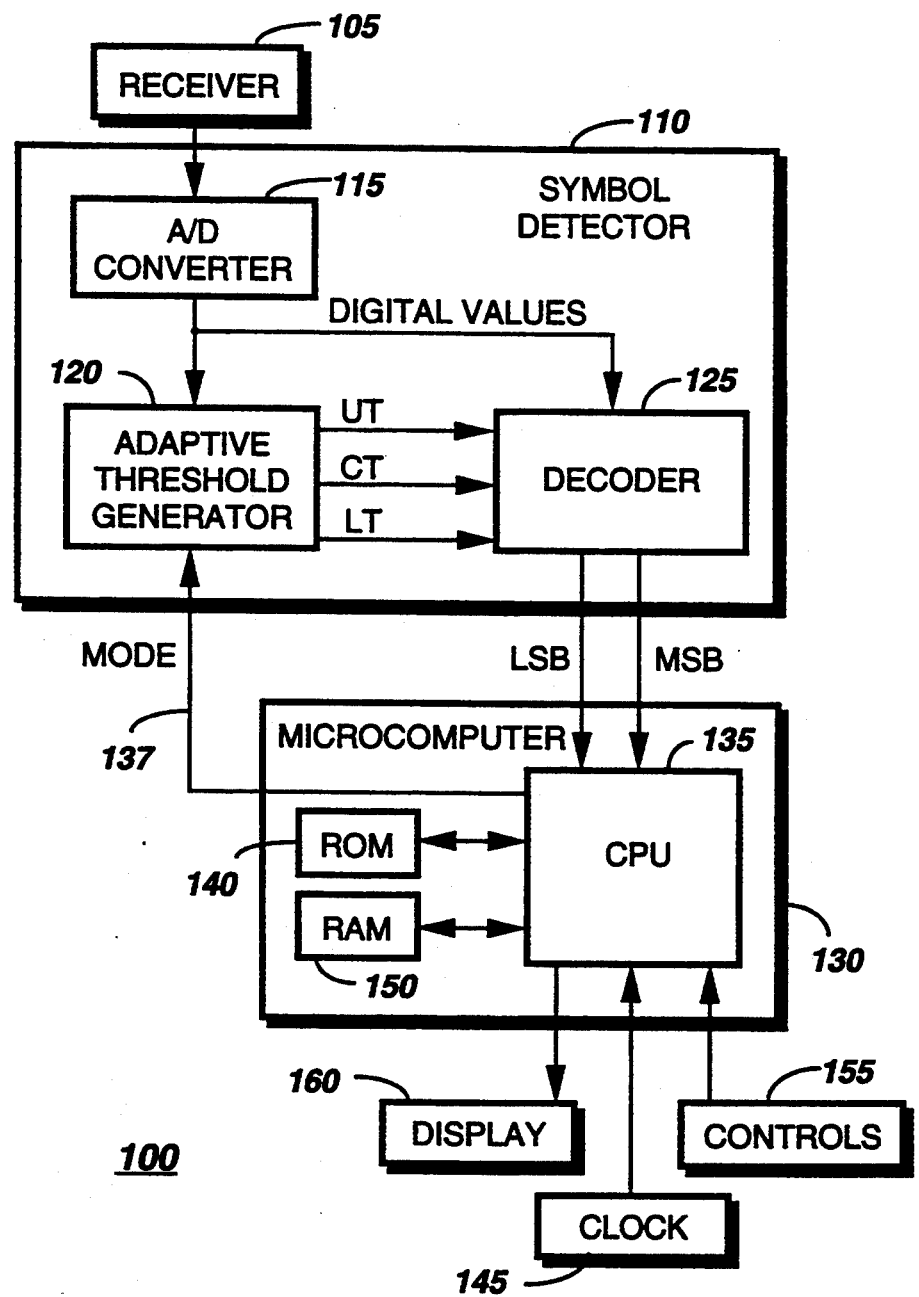
FIG. 1 is an electrical block diagram of a radio communication device for receiving signals transmitted in a four-level signalling format in accordance with the preferred embodiment of the present invention.

FIG. 1 is an electrical block diagram of a radio communication device 100 in accordance with a preferred embodiment of the present invention. The radio communication device 100 comprises a receiver 105 for demodulating and recovering analog signal voltages from a received radio frequency signal transmitted utilizing four-level frequency modulation (FM). The analog signal voltages are then provided to a symbol detector 110 for translating the analog signal voltages into data symbols, preferably in the form of bit patterns.

The symbol detector 110 comprises an analog-to-digital (A/D) converter 115 for converting the analog signal voltages provided thereto to digital values, which are eight bits in length, therefore ranging from 0 to 255, for an eight-bit analog-to-digital converter. The digital values are coupled to an adaptive threshold generator 120, which, in accordance with the preferred embodiment of the present invention, calculates upper, lower, and center thresholds from the digital values. The symbol detector 110 further comprises a decoder 125 coupled to the adaptive threshold generator 120 and the analog-to-digital converter 115 for generating the data symbols in accordance with the digital values and the upper, lower, and center thresholds, as may be better understood by referring to FIG. 2.

Figure 2:
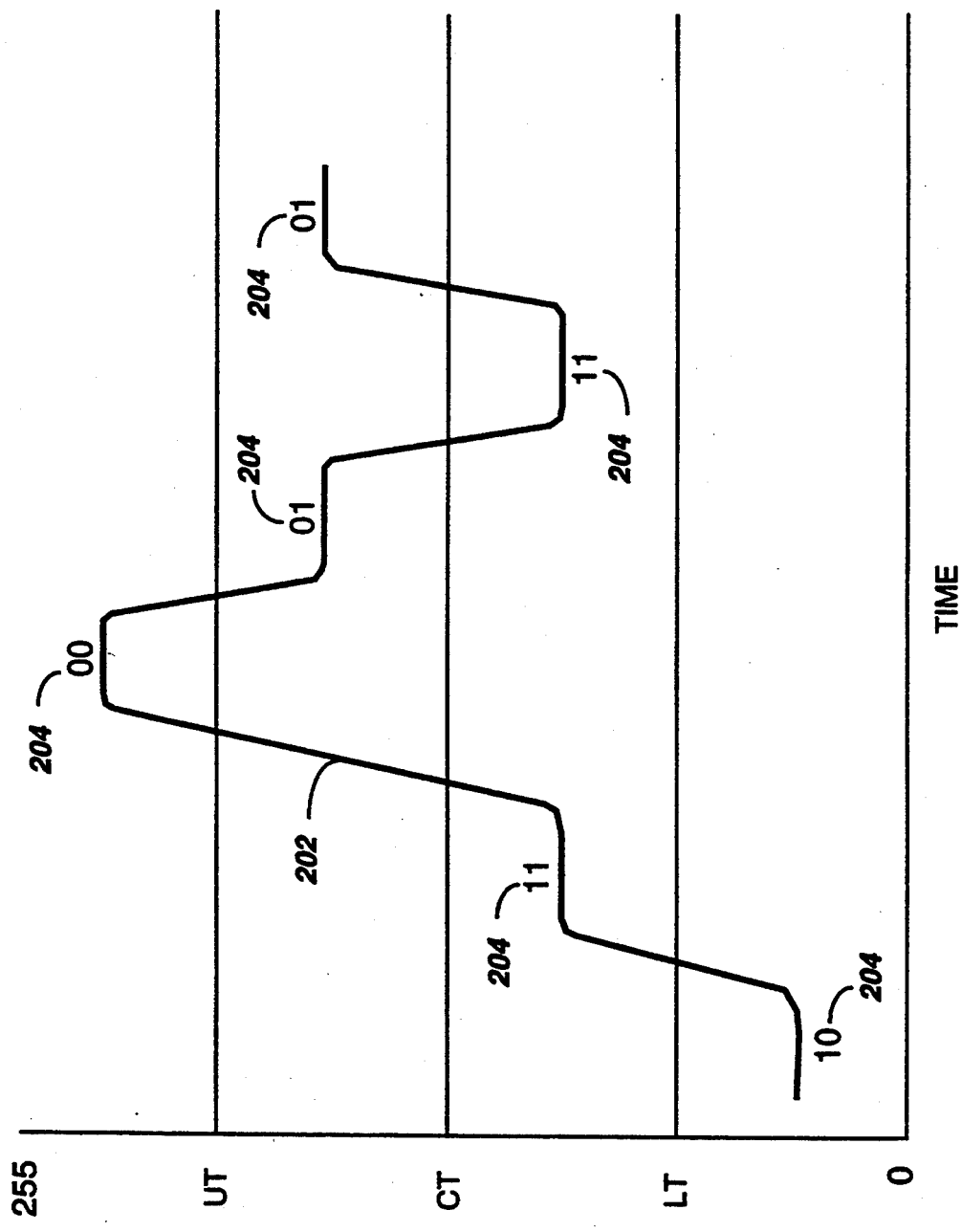
FIG. 2 is an example of a digital waveform comprising digital values corresponding to analog signal voltages of a four-level radio frequency signal in accordance with the preferred embodiment of the present invention.

FIG. 2 is a graph showing an example of a waveform 202 comprising recovered digital values corresponding to analog signal voltages for a four-level radio frequency signal received by the receiver 105. The decoder 125 (FIG. 1) receives the upper, lower, and center thresholds in the form of digital threshold values from the adaptive threshold generator 120. Additionally, the decoder 125 receives the digital values corresponding to the analog signal voltages. The decoder 125 thereafter determines which of four ranges, which are defined by the upper, lower, and center thresholds, encompasses the digital values and thereafter generates the appropriate data symbol. The data symbols, e.g., bit patterns 204, generated for each of the four ranges may be, for example, the following:

| Range | Bit Pattern |
| --- | --- |
| digital value > upper threshold (UT) | 0-0 |
| center threshold (CT) < digital value < UT | 0-1 |
| lower threshold (LT) < digital value < CT | 1-1 |
| digital value < LT | 1-0 |

Although it will be appreciated that the decoder 125 included in the symbol detector 110 generates the data symbols, e.g., the bit patterns 204, in a conventional manner, the symbol detector 110 yields more accurate results than conventional symbol detectors because the upper, lower, and center thresholds provided to the decoder 125 vary in accordance with the received four-level radio frequency signal, as will be explained in greater detail herein below. Conversely, in conventional symbol detectors, the upper, lower, and center thresholds are pre-programmed to conform with expected values associated with a received four-level signal and cannot be changed. As a result, if the voltage of the received signal is offset by a greater-than-expected amount, the pre-programmed thresholds can cause the erroneous generation of data symbols.

Returning to FIG. 1, the radio communication device 100 further includes a processor, which is preferably a microcomputer 130, for example, the MC68HC05 manufactured by Motorola, Inc. of Schaumburg, Ill. Alternatively, the processor can be implemented by hardwired logic capable of performing equivalent operations. The microcomputer 130 comprises a central processing unit (CPU) 135 for controlling the operation of the microcomputer 130 and for controlling the operation of the adaptive threshold generator 120 via a mode control line 137. The CPU 135 transmits signals over the mode control line 137 directing the adaptive threshold generator 120 to reset, track the incoming digital values to dynamically generate the thresholds, or to hold the current thresholds.

The CPU 135 receives and processes the data symbols provided by the symbol detector 110 in accordance with subroutines stored in a read only memory (ROM) 140. Because the data symbols may be inaccurate until after a receiver warm-up time, which is required for stabilization of receiver components, the CPU 135 references time values provided by a clock 145 coupled to the microcomputer 130 before decoding the data symbols to recover information, such as selective call messages, included therein. The information is then stored in a random access memory (RAM) 150, which is typically utilized for temporary storage of data, such as variables and decoded information, derived during operation of the radio communication device 100. When a selective call message is received, the CPU 135 preferably activates, either automatically or in response to signals conveyed by user controls 155, a display 160, which presents the message to a user.

Figure 3:
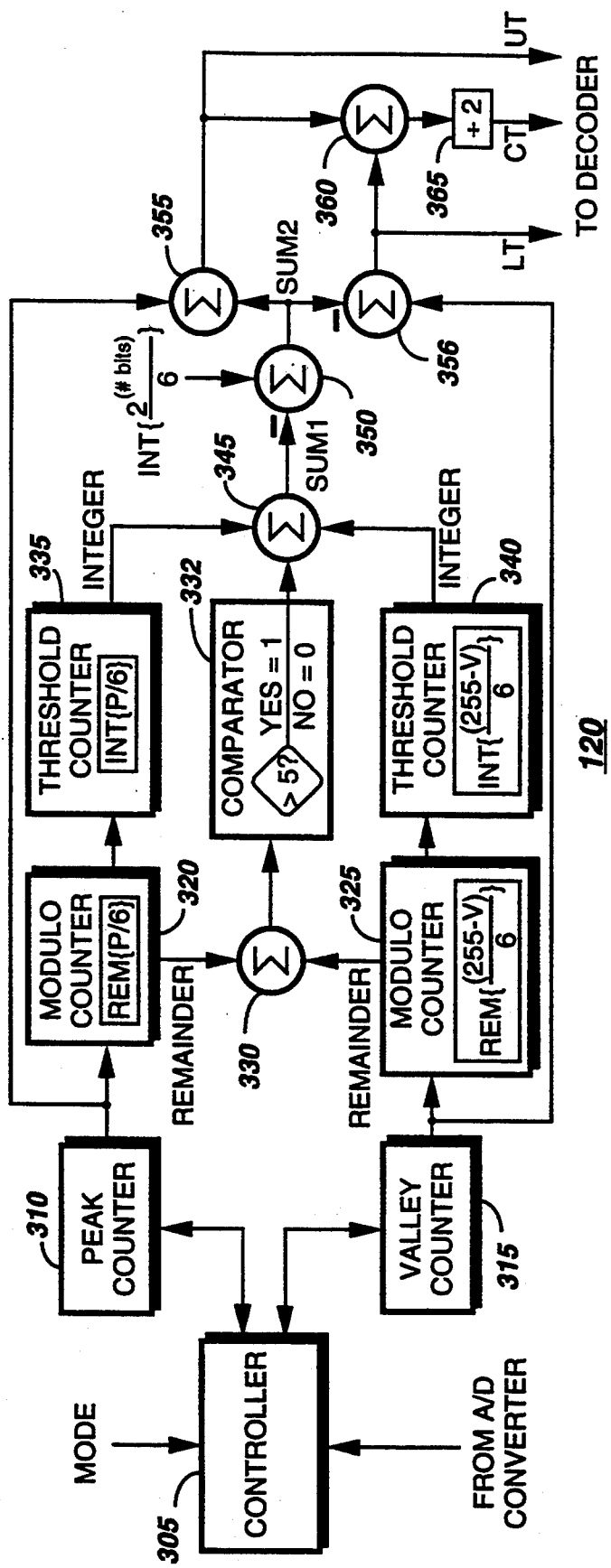
FIG. 3 is an electrical block diagram of an adaptive threshold generator included within the radio communication device of FIG. 1 for generating upper, lower, and center thresholds from the received signals in accordance with the preferred embodiment of the present invention.

Referring next to FIG. 3, a block diagram of the adaptive threshold generator 120 in accordance with the preferred embodiment of the present invention is depicted. The adaptive threshold generator 120 preferably comprises a controller 305 for receiving "reset", "track", and "hold" signals from the CPU 135 and for receiving the digital values from the analog-to-digital converter 115. When set in the "track" mode, the controller 305 increments a peak counter 310, which is initially set to zero, to track the digital values corresponding to the high voltages of the incoming radio frequency signal in a manner well known to one of ordinary skill in the art. A valley counter 315 is decremented by the controller 305 to track the digital values corresponding to the low signal voltages. The valley counter 315 is preferably initially set to its maximum value, which is 255 (1-1-1-1-1-1-1-1) for an eight-bit counter. Modulo-6 binary counters 320, 325 are coupled to the peak and valley counters 310, 315 for incrementing as the peak and valley counters 310, 315 are incremented and decremented, respectively. Because they are reset at every sixth increment, the modulo counters 320, 325 are utilized to store remainder values, which are digitally added by summer 330. The result of the addition is provided to a comparator 332 for comparing the sum of the remainders to a first predetermined number, e.g., five. When the sum of the remainders is greater than five, the comparator 332 generates a high output, i.e., a digital one.

The adaptive threshold generator 120 further comprises first and second threshold counters 335, 340, which are each coupled to one of the modulo counters 320, 325, as shown. Each threshold counter 335, 340 is incremented with each reset of the modulo counter 320, 325 respectively coupled thereto. Summer 345 then digitally adds the integer values stored by the threshold counters 335, 340 and the value provided at the output of the comparator 332 to result in a first sum value, SUM1, which is provided to summer 350. Summer 350 digitally adds the first sum value SUM1 to a second predetermined number which is hard-wired into summer 350. The second predetermined number is preferably determined by the number of bits of the analog-to-digital converter 115 and given by the equation $$INT\left\{\frac{2^{(\#bits)}}{6}\right\}.$$

If, for example, the analog-to-digital converter 115 is an eight-bit converter, the second predetermined number is forty-two (42). The result of the addition by summer 350 is a second sum value, SUM2.

Further included in the adaptive threshold generator 120 are summers 355, 356, the first 355 of which digitally adds the second sum value SUM2 to the peak value, i.e., the value stored in the peak counter 310, to generate the upper threshold UT, and the second 356 of which digitally subtracts the second sum value SUM2 from the valley value, i.e., the value stored in the valley counter 315, to generate the lower threshold LT. Summer 360 is employed to sum the upper and lower thresholds, the result of which is divided by two by divider 365 to generate the center threshold CT.

Figure 4:
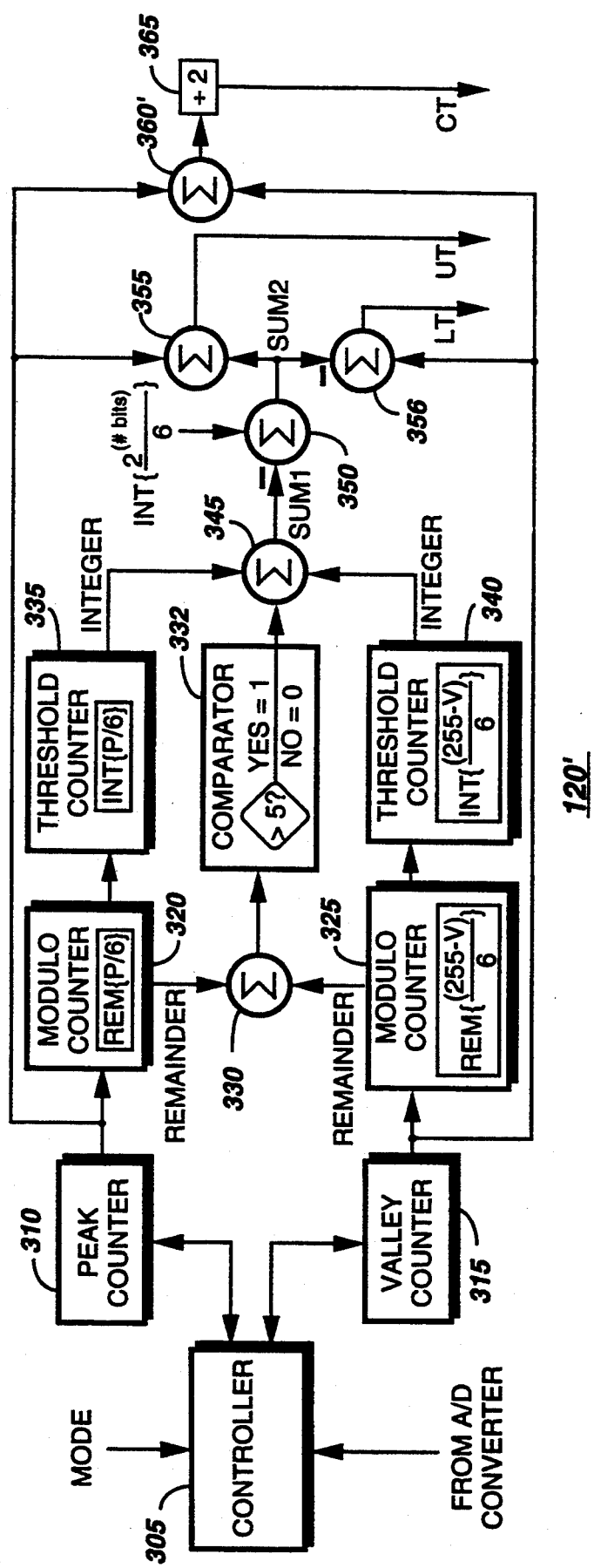
FIG. 4 is an electrical block diagram of an adaptive threshold generator for generating upper, lower, and center thresholds in accordance with an alternate embodiment of the present invention.

It will be appreciated that the center threshold CT may also be generated by summing the peak and valley values, as shown in the alternate embodiment depicted in FIG. 4. As shown, summer 360' is coupled to the peak and valley counters 310, 315 to arrive at the same resulting center threshold generated by the adaptive threshold generator 120 depicted in FIG. 3.

The adaptive threshold generator 120, as shown in FIG. 3 or FIG. 4, advantageously generates the upper, lower, and center thresholds from the digital values provided thereto. As the high and low signal voltages corresponding to the digital values change, perhaps signifying voltage offsets in the received signal, the peak and valley values, and thus the upper, lower, and center thresholds, are modified to reflect the voltage changes in the received signal. As a result, the data symbols generated by the decoder 125 remain accurate as the voltage offset of the received signal varies.

Figure 5:
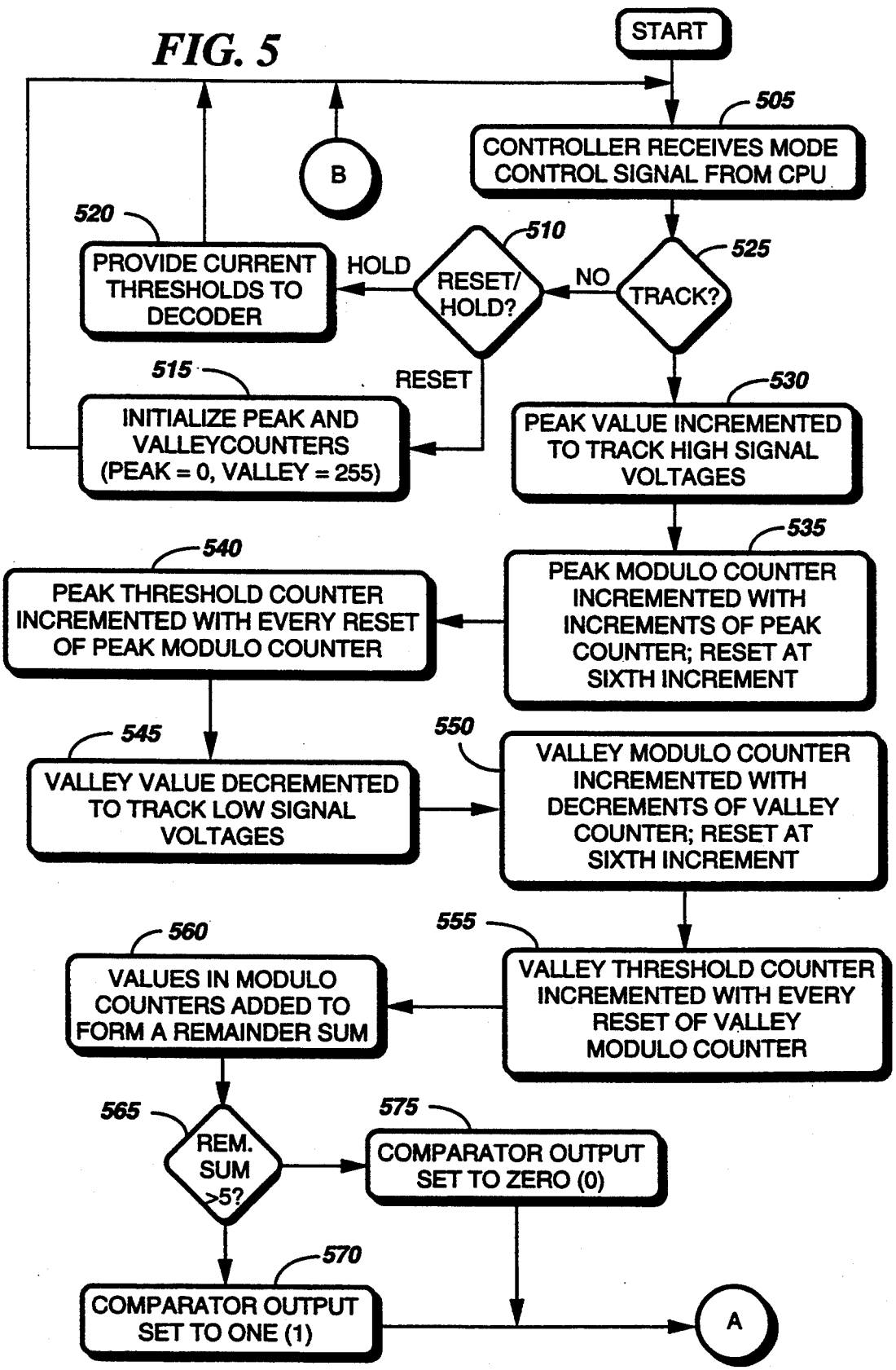
FIGS. 5 and 6 are flowcharts depicting the operation of the adaptive threshold generator of FIG. 3.
Figure 6:
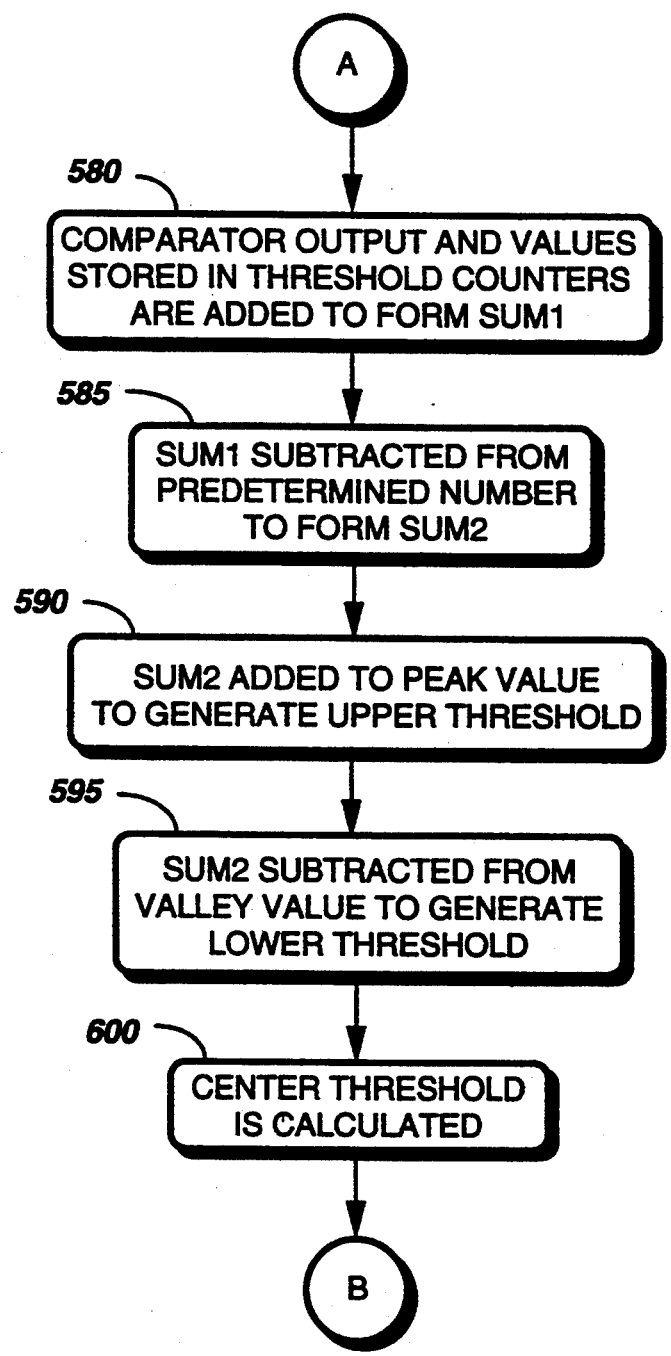

With reference to FIGS. 5 and 6, flowcharts depict the operation of the adaptive threshold generator 120. Upon powering up the radio communication device 100, the controller 305 (FIG. 3) receives, at step 505, the mode control signal from the CPU 135 (FIG. 1). When the controller 305 is set thereby in the "reset" mode, at step 510, the peak and valley counters 310, 315 are re-initialized, i.e., peak value=zero and valley value=-maximum value. When the controller 305 is set, at step 510, in the "hold" mode, upper, lower, and center thresholds continue to be generated, at step 520, from values currently stored by the peak and valley counters 310, 315, the modulo counters 320, 325, and the threshold counters 335, 340.

When, at step 525, the controller 305 is set in the "track" mode, the peak value stored in the peak counter 310 is incremented, at step 530, to track the digital values corresponding to the high signal voltages. The modulo counter 320 coupled to the peak counter 310 is, at step 535, incremented with every increment of the peak counter 310 and reset at every sixth increment. Therefore, the modulo counter 320 effectively stores the remainder of the quotient resulting from the division of the peak value by six, i.e., REM{P/6}. The threshold counter 335 is incremented, at step 540, each time the modulo counter 320 is reset and therefore stores the integer part of the quotient resulting from dividing the peak value by six, i.e., INT{P/6}.

Similarly, the controller 305 decrements, at step 545, the valley value set in the valley counter 315 to track the digital values corresponding to the low signal voltages. At step 550, the modulo counter 325 coupled to the valley counter 315 is incremented each time the valley value is decremented and is reset at every sixth increment. The modulo counter 325 therefore stores the remainder resulting from the division of a decrement value by six, wherein the decrement value is equivalent to the maximum valley value, e.g., 255, minus the decremented valley value. The value stored by the modulo counter 325 is given by the equation REM{(255−V)/6}. The threshold counter 340, which is incremented, at step 555, with every reset of the modulo counter 325, stores the integer part of the resulting quotient when the decrement value is divided by 6, i.e., INT{(255−V)/6}.

The remainders stored in the modulo counters 320, 325 are then summed, at step 560, by summer 330 (FIG. 3), and the result is provided to the comparator 332. When, at step 565, the sum of the remainders is greater than a first predetermined number, preferably five, the comparator output is set to one, at step 570. When the sum of the remainders is not greater than five, the comparator output is, at step 575, set to zero. Thereafter, summer 345 adds, at step 580, the value generated by the comparator 332 and the values stored by the threshold counters 335, 340 to result in the first sum value, SUM1, and summer 350 subtracts, at step 585, the first sum value from a second predetermined number to result in a second sum value, SUM2. As described above, the second predetermined number is dependent upon the number of bits of the analog-to-digital converter 115 and is given by the aforementioned equation.

The second sum value is then added, at step 590, to the peak value by summer 355, which generates the upper threshold. Additionally, the second sum value is subtracted, at step 595, from the valley value by summer 356, which generates the lower threshold. The center threshold is next generated, at step 600, in one of the two ways described above in reference to FIGS. 3 and 4.

In summary, the symbol detector in accordance with the preferred embodiment of the present invention translates analog signal voltages to data symbols utilizing an adaptive threshold generator. The adaptive threshold generator determines peak and valley values associated with high and low signal voltages, respectively, and calculates therefrom upper, lower, and center thresholds for transmission to a decoder, which generates the data symbols provided to a microcomputer. In this manner, the decoder is able to accurately generate the data symbols even when the voltage offset of the received radio frequency signal varies. In conventional radio communication devices, on the other hand, the thresholds utilized for generation of data symbols are pre-programmed and unable to change. As a result, when the voltage offset of the carrier is great enough, the data symbols may be generated incorrectly.

It may be appreciated by now that there has been provided a method and apparatus for dynamically varying the thresholds in accordance with which data symbols are generated in response to variations in the voltage offset of a received radio frequency signal.

What is claimed is:

1. A method for generating data symbols from a received signal having multiple signal voltages, the method comprising the steps of:
   tracking signal voltages of the received signal to determine peak and valley values associated with high and low voltages, respectively, of the received signal;
   calculating therefrom upper, lower, and center thresholds of the received signal, wherein the upper, lower, and center thresholds define four ranges of values, and wherein the calculation of the upper and lower thresholds comprises the steps of:
   dividing the peak value and a decrement value by a first predetermined number to result, respectively, in first and second integers and first and second remainders, wherein the decrement value is equivalent to the number of times a counter has been decremented to result in the valley value;
   adding, when the sum of the first and second remainders is greater than a second predetermined number, the first and second integers and a third predetermined number to result in a first sum value;
   adding, when the sum of the first and second integers is not greater than the second predetermined number, the first and second integers to result in the first sum value;
   subtracting the first sum value from a fourth predetermined number to result in a second sum value;
   adding the second sum value and the peak value to generate the upper threshold; and
   subtracting the second sum value from the valley value to generate the lower threshold; and
   determining which of the four ranges of values encompasses a received signal voltage; and
   generating, in response to the determining step, one of four possible data symbols.

2. The method according to claim 1, wherein the calculation of the center threshold comprises the steps of:
   adding the upper and lower thresholds to result in a third sum value; and
   dividing the third sum value by two to generate the center threshold.

3. The method according to claim 1, wherein the calculation of the center threshold comprises the steps of:
   adding the peak and valley values to result in a third sum value; and
   dividing the third sum value by two to generate the center threshold.

4. A method for generating data symbols from a received signal having multiple signal voltages, the method comprising the steps of:
   tracking signal voltages of the received signal to determine peak and valley values associated with high and low voltages, respectively, of the received signal;
   dividing the peak value and a decrement value by six to result, respectively, in first and second integers and first and second remainders, wherein the decrement value is equivalent to the number of times a counter has been decremented to result in the valley value;
   adding, when the sum of the first and second remainders is greater than five, the first and second integers and a first predetermined number to result in a first sum value, wherein the first predetermined number is equal to one;
   adding, when the sum of the first and second integers is not greater than five, the first and second integers to result in the first sum value;
   subtracting the first sum value from a second predetermined number to result in a second sum value;
   adding the second sum value and the peak value to generate an upper threshold;
   subtracting the second sum value from the valley value to generate a lower threshold;
   calculating a center threshold in accordance with the peak and valley values, wherein the upper, lower, and center thresholds define four ranges of values;
   determining which of the four ranges of values encompasses a received signal voltage; and
   generating, in response to the determining step, one of four possible data symbols.

5. The method according to claim 4, wherein the calculating step comprises the steps of:
   adding the upper and lower thresholds to result in a third sum value; and
   dividing the third sum value by two to generate the center threshold.

6. The method according to claim 4, wherein the calculating step comprises the steps of:
   adding the peak and valley values to result in a third sum value; and
   dividing the third sum value by two to generate the center threshold.

7. A symbol detector for generating data symbols from a received signal having multiple signal voltages, the symbol detector comprising:
   an analog-to-digital converter for converting the multiple signal voltages to digital values;
   peak and valley counters coupled to the analog-to-digital converter for tracking the digital values to determine peak and valley values associated with high and low voltages, respectively, of the received signal;
   calculating means coupled to the peak and valley counters for calculating upper, lower, and center thresholds in accordance with the peak and valley values, wherein the calculating means comprises:
   dividing means for dividing the peak value and a decrement value by a first predetermined number to result, respectively, in first and second integers and first and second remainders, wherein the decrement value is equivalent to the number of times the valley counter has been decremented to result in the valley value;

a first summer coupled to the dividing means for adding, when the sum of the first and second remainders is greater than a second predetermined number, the first and second integers and a third predetermined number to result in a first sum value, and for adding, when the sum of the first and second remainders is not greater than the second predetermined number, the first and second integers to result in the first sum value;

a second summer coupled to the first summer for subtracting the first sum value from a fourth predetermined number to result in a second sum value;

a third summer coupled to the second summer and the decoder for adding the second sum value to the peak value to generate the upper threshold; and a fourth summer coupled to the third summer and the decoder for subtracting the second sum value from the valley value to generate the lower threshold; and a decoder coupled to the analog-to-digital converter and the calculating means for generating the data symbols in accordance with the digital values and the upper, lower, and center thresholds.

8. The symbol detector according to claim 7, wherein the calculating means further comprises:

a fifth summer coupled to the third and fourth summers for adding the upper and lower thresholds to result in a third sum value; and a divider coupled to the fifth summer and the decoder for dividing the third sum value by two to generate the center threshold.

9. The symbol detector according to claim 7, wherein the calculating means further comprises:

a fifth summer coupled to the peak and valley counters for adding the peak and valley values to result in a third sum value; and a divider coupled to the fifth summer and the decoder for dividing the third sum value by two to generate the center threshold.

10. The symbol detector according to claim 7, wherein the dividing means comprises:

first and second modulo counters coupled to the peak and valley counters, respectively, for dividing the peak value and the decrement value by the first predetermined number and storing the first and second remainders;

first and second threshold counters coupled to the first and second modulo counters, respectively, and the first summer for storing the first and second integers and providing the first and second integers to the first summer;

a fifth summer coupled to the first and second modulo counters for summing the first and second remainders; and a comparator coupled to the fifth summer and the first summer for comparing the sum of the first and second remainders to the second predetermined number and for providing the third predetermined number to the first summer when the sum of the first and second remainders is greater than the second predetermined number.

11. The symbol detector according to claim 7, wherein the first predetermined number is equal to six.

12. A radio communication device for processing a received signal to recover information included therein, the radio communication device comprising:

a receiver for demodulating the received signal to provide analog signal voltages therefrom;

a symbol detector coupled to the receiver for generating data symbols from the analog signal voltages provided thereto; and a processor coupled to the symbol detector for receiving the data symbols and recovering therefrom the information included in the received signal; and wherein the symbol detector includes:

an analog-to-digital converter for converting the analog signal voltages to digital values;

peak and valley counters coupled to the analog-to-digital converter for tracking the digital values to determine peak and valley values associated with high and low voltages, respectively, of the received signal;

calculating means coupled to the peak and valley counters for calculating upper, lower, and center thresholds in accordance with the peak and valley values; and a decoder coupled to the calculating means and the analog-to-digital converter for generating the data symbols from the upper, lower, and center thresholds and the digital values; and wherein the calculating means includes:

dividing means for dividing the peak value and a decrement value by a first predetermined number to result, respectively, in first and second integers and first and second remainders, wherein the decrement value is equivalent to the number of times the valley counter has been decremented to result in the valley value;

a first summer coupled to the dividing means for adding, when the sum of the first and second remainders is greater than a second predetermined number, the first and second integers and a third predetermined number to result in a first sum value, and for adding, when the sum of the first and second remainders is not greater than the second predetermined number, the first and second integers to result in the first sum value;

a second summer coupled to the first summer for subtracting the first sum value from a fourth predetermined number to result in a second sum value;

a third summer coupled to the second summer and the decoder for adding the second sum value to the peak value to generate the upper threshold; and a fourth summer coupled to the third summer and the decoder for subtracting the second sum value from the valley value to generate the lower threshold.

13. The radio communication device according to claim 12, wherein the calculating means further comprises:

a fifth summer coupled to the third and fourth summers for adding the upper and lower thresholds to result in a third sum value; and a divider coupled to the fifth summer and the decoder for dividing the third sum value by two to generate the center threshold.

14. The radio communication device according to claim 12, wherein the calculating means further comprises:

a fifth summer coupled to the peak and valley counters for adding the peak and valley values to result in a third sum value; and a divider coupled to the fifth summer and the decoder for dividing the third sum value by two to generate the center threshold.

15. The radio communication device according to claim 12, wherein the dividing means comprises:

first and second modulo counters coupled to the peak and valley counters, respectively, for dividing the peak value and the decrement value by the first predetermined number and storing the first and second remainders;

first and second threshold counters coupled to the first and second modulo counters, respectively, and the first summer for storing the first and second integers and providing the first and second integers to the first summer;

a fifth summer coupled to the first and second modulo counters for summing the first and second remainders; and a comparator coupled to the fifth and second remainders to the second predetermined number and for providing the third predetermined number to the first summer when the sum of the first and second remainders is greater than the second predetermined number.

16. The symbol detector according to claim 12, wherein the first predetermined number is equal to six.

17. An adaptive threshold generator for generating upper and lower thresholds from digital values corresponding to analog signal voltages of a received signal, the adaptive threshold generator comprising:

peak and valley counters for tracking the digital values to determine peak and valley values associated with high and low voltages, respectively, of the received signal;

first and second modulo counters coupled to the peak and valley counters, respectively, for dividing the peak value and a decrement value by six and storing first and second remainders resulting therefrom, wherein the decrement value is equivalent to the number of times the valley counter has been decremented;

first and second threshold counters coupled to the first and second modulo counters, respectively, for storing first and second integers resulting from the division of the peak value and the decrement value by six;

a first summer coupled to the first and second modulo counters for summing the first and second remainders;

a comparator coupled to the first summer for generating a first predetermined number when the sum of the first and second remainders is greater than a second predetermined number;

a second summer coupled to the first and second threshold counters and the comparator for adding the first and second integers and the first predetermined number, when provided, to result in a first sum value;

a third summer coupled to the second summer for subtracting the first sum value from a third predetermined number to result in a second sum value;

a fourth summer coupled to the third summer for adding the second sum value and the peak value to generate the upper threshold; and a fifth summer coupled to the third summer for subtracting the second sum value from the valley value to generate the lower threshold.

* * * * *

UNITED STATES PATENT AND TRADEMARK OFFICE
CERTIFICATE OF CORRECTION

PATENT NO. : 5,425,056
DATED      : June 13, 1995
INVENTOR(S) : Carla J. Maroun

It is certified that error appears in the above-indentified patent and that said Letters Patent is hereby corrected as shown below:

Column 11, line 23, after fifth insert --summer and the first summer for comparing the sum of the first--.

Signed and Sealed this

Twenty-first Day of November, 1995

Attest:

BRUCE LEHMAN

*Attesting Officer*    *Commissioner of Patents and Trademarks*